Patented Apr. 9, 1929.

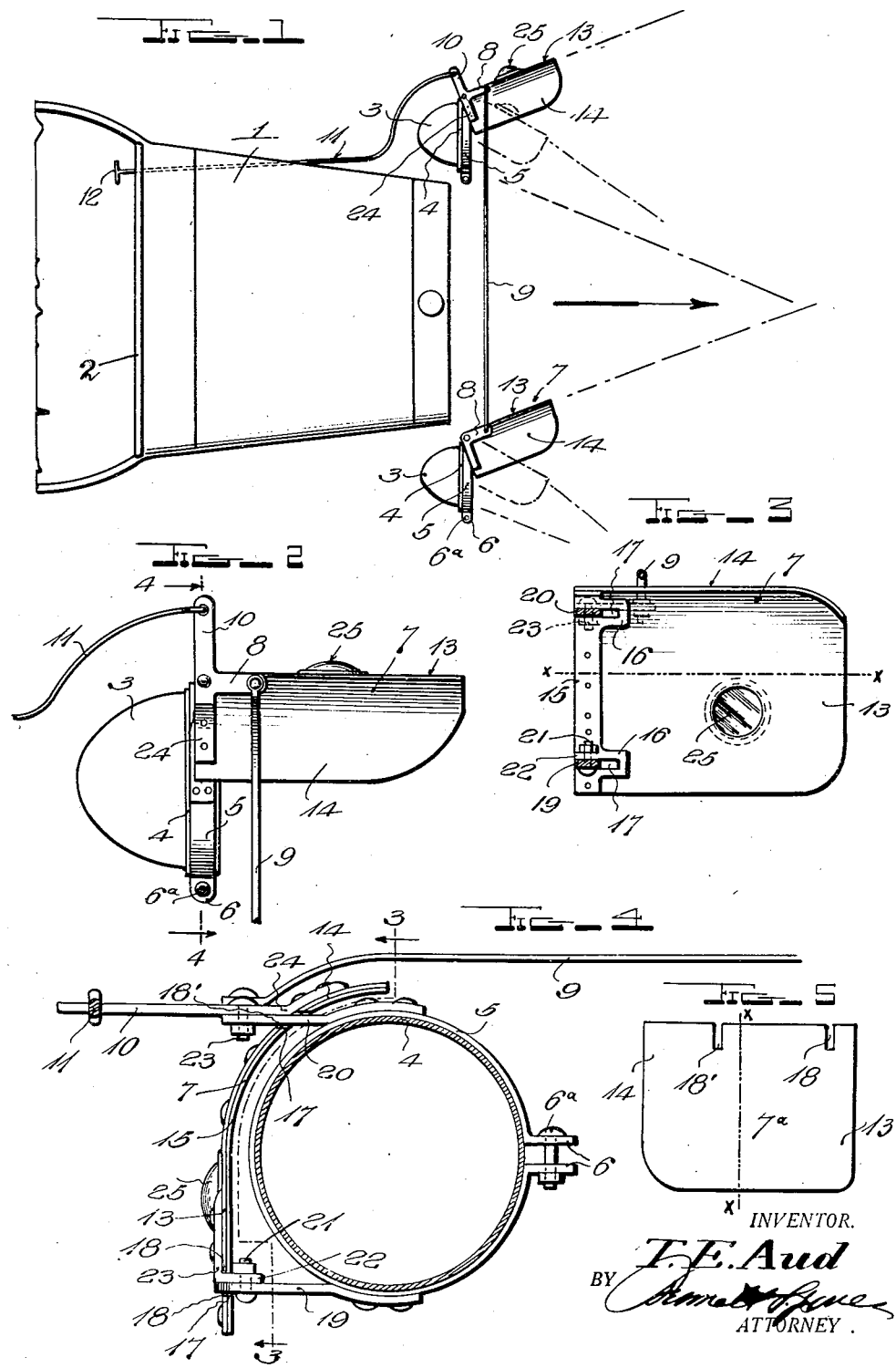

1,708,561

UNITED STATES PATENT OFFICE.

THOMAS E. AUD, OF HERNDON, VIRGINIA.

LIGHT DEFLECTOR FOR HEADLIGHTS.

Application filed November 13, 1925. Serial No. 68,850.

This invention relates to light deflectors for headlights, such as the headlights of automobiles and other vehicles, and contemplates the provision of means whereby the driver of the vehicle may control the direction of the rays of light to secure thorough illumination of the roadway in the line of travel of his vehicle, while at the same time preventing the rays of light from blinding the driver of an approaching vehicle traveling in the opposite direction.

The present invention is an improvement upon the type of light deflector shown in my prior application, Serial No. 749,718, filed November 13, 1924.

One object of my invention is to provide deflecting means which may be mounted in a ready and convenient manner upon the ordinary rigid headlight lamps of a vehicle and operated for controlling the direction of the light rays without in any manner disturbing the headlight lamps or any of the working parts thereof.

Another object of the invention is to provide light deflecting means of simple construction which may be applied to existing headlight lamps, without in any manner changing the construction of such lamps, and which at the same time may be conveniently operated for light deflecting purposes by the driver from his seat position in the vehicle.

Still another object of the invention is to provide light deflectors of novel construction, mounted upon the respective headlight lamps, and which are movable in unison from a normal position at the left hand side of the headlight lamps laterally across the fronts of the lamps and toward the right hand side of the vehicle and the roadway, allowing the light rays to be deflected away from a vehicle traveling on the opposite side of the roadway and in the opposite direction, while maintaining the direction of the light rays in such manner as to fully illuminate the portion of the half of the roadway and its border along which the vehicle equipped with the invention is traveling, so as to allow the driver of the vehicle equipped with the invention to have the full benefit of the illumination from his headlights while preventing the glare thereof from being thrown into the eyes of the driver of a vehicle traveling in the opposite direction on the other side of the roadway.

Still another and a particular object of my present invention is to provide a construction of channeled light deflectors whereby the deflectors will perform the functions described while said deflectors will at the same time offer no obstruction to the deflection of the light rays against the ground immediately in front of the vehicle, but on the contrary will project the light rays against the ground so that the roadway from a point in front of the vehicle to a distance in advance thereof will be clearly illuminated.

With these and other objects in view, the invention consists of the features of construction, combination and arrangement of parts, hereinafter fully described and claimed, reference being had to the accompanying drawing, in which:—

Figure 1 is a top plan view of the front of an automobile equipped with the usual headlights and with deflectors embodying my invention, showing in full lines the deflectors as normally arranged to illuminate the whole roadway and in dotted lines shifting of the deflectors to direct the light rays toward one side of the roadway.

Figure 2 is a top plan view of one of the headlight lamps and the deflector carried thereby on an enlarged scale.

Figure 3 is a vertical longitudinal section through one of the deflectors taken on the line 3—3 of Figure 4.

Figure 4 is a vertical transverse section on the line 4—4 of Figure 2.

Figure 5 is a plan view of the blank from which the light deflector is made.

Referring now more particularly to the drawing, 1 designates the front portion of an automobile or similar vehicle, 2 the instrument board thereof, and 3 the usual headlight lamps rigidly mounted at the front of the vehicle in any of the well known ways. Each of these lamps may be provided with the usual annular rigidly or detachably mounted, generally detachably mounted, lens carrying frame 4 at the front thereof.

In carrying my invention into practice, I provide for application to the part 4, or some other suitable part of each headlight lamp 3, a split annular clamping band or ring 5 having at its end portions ears 6 bent outwardly therefrom and apertured for the passage of a fastening screw, bolt or the like 6ª, whereby the ends of the band may be connected and the band drawn tightly in clamped position about the frame ring 4.

Supported by each band 5 is a light deflector 7, made of sheet metal or other suitable material, the deflectors 7 being pivotally mounted, as hereinafter described, for swinging movements on their bands 5 and provided with crank arms 8 coupled by a connecting rod 9 whereby the two deflectors are connected for swinging movements of equal degrees in unison. One of the deflectors is also provided with a crank arm 10 coupled to the forward end of an operating rod 11 extending rearwardly through the engine compartment of the vehicle and through the instrument board 2 and having an operating knob or handle 12 at its rear end whereby it may be manipulated to adjust the deflectors as desired. The rod 9, as shown, extends transversely at the front of the vehicle and operates, when motion is transmitted to the crank arm 10 and associated crank arm 8 of one deflector, to communicate similar motion to the crank arm 8 of the other deflector.

Each deflector 7 is substantially of channeled form, and of approximately rectangular or oblong rectangular form in plan, and is made from a sheet metal blank 7ª of the form shown in Figure 5. The shield formed from each blank comprises a body portion 13 and a crown or head portion 14. The body portion 13 is vertically disposed and is straight and flat between its front and rear edges and also between its lower edge and its point of intersection with the base of the portion 14, at or along the line x—x of Figure 3 and the corresponding line in Figure 5, along which line x—x of Figure 5 the blank is bent laterally and given a transverse or arched curvature to produce the portion 14. From the line x—x of Figure 3 the portion 14 extends upwardly and inwardly beyond the inner face of the body portion on an arc of curvature of greater radius but corresponding substantially to the arc of curvature of a portion of the frame 4 about which it lies. The purpose of so forming each light shield 7 is to secure certain deflecting actions, as hereinafter fully described.

The rear edge of the deflector 7 is provided with a stiffening band 15 which extends along its rear edge from its bottom edge to the edge of the portion 14 and is riveted or otherwise secured thereto. This band 15 is provided with forwardly projecting transverse offsets 16 formed with slots 17, said slots registering with notches or recesses 18 and 18' formed in the deflector portions 13 and 14 and opening through the rear edges thereof. Riveted or otherwise fixed at their inner ends to the band 5 are bracket arms 19 and 20, which extend in superposed relation from the band beyond one side thereof and through the slots 17 of the stiffening band 15 and the notches or recesses 18 and 18' of the deflector. The outer end of the lower arm 19 is secured by a pivot pin or bolt 21 to an inwardly extending arm 22 of an L-shaped bracket 23, the outer arm of which bracket is riveted or otherwise fastened to the outer side of the shield portion 13 and the arm 22 of which extends inwardly through the recess 18 and registering slots 17 so as to dispose the pivot 21 at a point between the band 4 and the inner side of the vertical portion 13 of the shield. The outer end of the upper bracket arm 20 is secured by a pivot pin or bolt 23 to a bracket member 24 extending outwardly through the recess 18' and the registering slot 17, so as to dispose the pivot 23 on the outer side of the deflector and above the portion 14 thereof, but in vertical alinement with the pivot 21. Each deflector is thus supported and mounted to swing laterally across the front of the lens frame 4 of the headlight 3 to which it is applied without interference from the headlight, the notches or recesses 18 and 18' permitting each deflector to swing to the oblique normal positions shown in full lines in Figure 1, at which point the rear edge of the deflector or its stiffened strip 15 engages the adjacent side of the band 5 and prevents further movement of the deflector in such direction. As shown, the bracket 24 is preferably formed integral with the associated crank arms 8 and 10, so as to make said crank arms component parts thereof.

It will be observed that the two deflectors 7 are mounted in the same manner upon the two headlights 3 at the opposite sides of the vehicle, but are disposed so that they lie on what I term the inner or left hand sides of the headlights, so that the convex faces of the deflectors face toward the left hand side of the vehicle, while the concaved or open sides of the deflectors face toward the right hand side of the vehicle. When the two deflectors are in normal position, with the rod 11 at its rearward limit of movement, the deflectors are disposed in the full line position shown in Figure 1, in which position they are swung inwardly toward the left hand side of the roadway at an oblique angle to a line parallel with the line of the vehicle. By pulling rearwardly upon the rod 11, the two deflectors 7 may be shifted from this position inwardly or laterally to different degrees desired toward the right hand side of the vehicle, so as to intercept more or less fully the rays of light cast from the lenses on the left half of the vertical centers of the latter, the full extent of lateral inward movement of the deflectors being illustrated by dotted lines in Figure 1. The degree of motion of each deflector from its normal full line position shown in Figure 1, toward the right across the front of its headlight and across the path of the beam of light projected thereby, may range to a reverse oblique position, at an angle of 120°, more or less, at its tip to the axial center of the beam, and it may obviously be adjusted to any intermediate position for lateral deflection of the light rays to any extent desired according to conditions in the travel of the vehicle along a straight or curved part of a roadway.

Assuming that the vehicle shown in Figure 1 is traveling in the direction of the arrow on the right hand side of the road, with the headlight deflectors 7 arranged in the full line position, it will be seen that the full rays from the lamps 3 will be projected forwardly by the lamp deflectors ahead of the vehicle, and that a large proportion of these rays will be permitted, by the lateral left hand inclination of the deflectors, to pass at an angle ahead of the vehicle toward the left hand side of the roadway, whereby all or the greater portion of the roadway, from side to side thereof, will be illuminated, so that a full and complete view of the roadway may be obtained by the driver. Assuming, however, that another vehicle, traveling in the opposite direction along the opposite side of the highway is approaching the vehicle first-mentioned, the operator on the latter-named vehicle may by pushing forwardly on the rod 11 swing the deflectors 7 laterally toward the right hand side of his vehicle, to a greater or less extent up to the dotted line position shown in Figure 1, as a result of which the deflectors will be shifted transversely to the center line of the light beams, so that they assume a reverse inclination toward the right hand side of the roadway, bringing their closed sides or body portions 13 so as to lie in the line of the rays emanating from the left hand sides of the centers of the lamps 3, thus deflecting said rays toward the right hand side of the road, while the rays from the right hand sides of the centers of said lamps will be projected in a direct line ahead. The light rays as a whole will thus be intercepted to a greater or less extent by the deflectors and project ahead of the vehicle and toward the right hand side or border of the roadway and cut off from the left hand side of the roadway and shielded from the vehicle traveling in the opposite direction. This operation may be accomplished without dimming the bright lights in use when the vehicle is traveling along a dark roadway, so that the full depth of the roadway along which the vehicle equipped with the invention is traveling, including the gutter or border, will be brightly illuminated, allowing the driver of such vehicle to have a full view of that portion of the roadway along which he is traveling, while at the same time the rays of light will be moved out of the course of travel of the vehicle running in the opposite direction, thus shielding the eyes of the driver of such oppositely traveling vehicle from glare. The driver of the vehicle equipped with the invention will, therefore, be permitted to have the full benefit of bright illumination from his headlights in order that he may have a clear view of the roadway in his course of travel, while at the same time no rays of light will be thrown into the path of the driver of the vehicle to confuse or blind him and thereby possibly cause an accident.

The purpose of making each deflector 7 of the shape described, to wit, making the portion 13 straight and vertical and the portion 14 transversely arched, is to provide a channeled deflector which will intercept the light rays and prevent their projection to different degrees in one direction laterally of the vehicle, while at the same time preventing the deflected rays from being cast upwardly, while permitting them to be cast forwardly and downwardly. The open side of the deflector is thus open at the front, and at the base, and at one side, but closed at its top and at its opposite side, so that the intercepted light rays may be cast forwardly at the front and in a direction according to the inclination of the deflector, while they may also be projected downwardly against the ground. This form of shield overcomes an objection to shields which are closed or curved inwardly at the base, and which, therefore, when shifted transversely of the vehicle, will cut off the light rays from the ground and make the ground area dark in front of the vehicle and for some distance ahead. By making the shield formation such so that the shield will be fully open to cast the light rays downward the roadway will be fully illuminated from the front of the vehicle forwardly, except such portion at the left of the vehicle which may be darkened by adjustment of the deflectors, so that the driver of the vehicle equipped with the invention will have his course of travel fully illuminated. If desired the portion 13 of each shield or of the shield at the left hand side of the vehicle only may be provided with a light aperture closed by a panel 25 of transparent material, colored green or some neutral color, and which when the deflector is adjusted to the dotted line position shown in Figure 1 will give a signal indication to the driver of the vehicle running in the opposite direction, which signal may be used in addition to the green light of the usual parking lamp, if the latter is used, to indicate the line of the left hand side of the vehicle, so that two vehicles similarly equipped with headlight deflectors embodying my invention and traveling in opposite directions, with a darkened portion of the roadway between them, may be guided in steering their vehicles for proper clearance at the moment of passing.

The advantages of my invention will be readily understood from the foregoing description and to those versed in the art without the necessity of an extended discussion. It may be pointed out, however, that the deflectors may be mounted upon ordinary rigid headlight lamps of the kind customarily employed, without changing the construction of these lamps in any manner whatever, allowing the lamps to be rigidly mounted in the usual way. By this means the necessity of employing dirigible headlights will be avoided and better results obtained in a more efficient and reliable manner. Moreover, by the use of my deflectors, the light rays may be positively cut off from the line of vision of the driver of a vehicle traveling in the opposite direction, preventing any confusing rays of light being cast in such direction, without diminishing illumination of that portion of the road along which the vehicle equipped with the invention is traveling, with manifest advantages. If two approaching vehicles traveling in opposite directions are equipped with my invention, the drivers both, by adjusting their deflectors, may proceed to pass each other with full confidence and without diminished speed, as their respective portions of the road will be fully illuminated for their safety and convenience, while the driver of each vehicle will be shielded from all glare from the lights of the other, as will be readily understood.

The concaved face of each deflector may be provided with a nickeled or other suitably formed reflecting surface for an obvious purpose.

Having thus fully described my invention, I claim:—

1. A headlight deflector comprising a shield consisting of a plate of generally oblong rectangular outline form and having a body portion which is longitudinally straight between its front and rear edges and vertically straight from its bottom edge to a point above its horizontal center, the upper portion of said plate above said point being longitudinally straight but projected laterally beyond one side of the plate on an arcuate line of curvature, a band adapted to embrace the lens frame of a headlight, and supporting members respectively engaging the vertically straight body and arcuately curved top portions of said shield and supporting the shield from and pivotally connecting it at its rear edge with said band.

2. A headlight deflector comprising a shield consisting of a plate of generally oblong rectangular outline form and having a body portion which is longitudinally straight between its front and rear edges and vertically straight from its bottom edge to a point above its horizontal center, the upper portion of said plate above said point being longitudinally straight but projected laterally beyond one side of the plate on an arcuate line of curvature, a stiffening band secured to the rear edge of the deflector, said band and deflector having upper and lower slots extending parallel with the axis of the body of the deflector plate, a band adapted to embrace the lens frame of a headlight, upper and lower bracket arms fixed to the latter-named band and adapted to be received in said slots in the retracted position of the deflector, and bracket arms carried by the deflector and hinged to the first-named bracket arms.

In testimony whereof I affix my signature.

THOMAS E. AUD.